US012675453B2

(12) United States Patent
Abdelaal

(10) Patent No.: US 12,675,453 B2
(45) Date of Patent: Jul. 7, 2026

(54) SYSTEMS AND/OR METHODS FOR AUTOMATED REPAIR OF DATA USED IN MACHINE LEARNING MODELS VIA COUNTERFACTUAL GENERATION AND MAPPING

(71) Applicant: SOFTWARE GmbH, Darmstadt (DE)

(72) Inventor: Mohamed Abdelaal, Stuttgart (DE)

(73) Assignee: SOFTWARE GmbH, Darmstadt (DE)

( * ) Notice: Subject to any disclaimer, the term of this patent is extended or adjusted under 35 U.S.C. 154(b) by 0 days.

(21) Appl. No.: 18/973,901

(22) Filed: Dec. 9, 2024

(65) Prior Publication Data

US 2026/0161617 A1 Jun. 11, 2026

(51) Int. Cl.
*G06F 16/00* (2019.01)
*G06F 16/215* (2019.01)
*G06F 16/2458* (2019.01)

(52) U.S. Cl.
CPC ........ *G06F 16/215* (2019.01); *G06F 16/2458* (2019.01)

(58) Field of Classification Search
None
See application file for complete search history.

(56) References Cited

U.S. PATENT DOCUMENTS 12,153,596 B1 * 11/2024 Shivarathri ........... G06F 16/254
2016/0364325 A1 * 12/2016 Ouzzani .............. G06F 11/3684

2017/0031749 A1 * 2/2017 Gupta ..................... G06F 3/067
2020/0349169 A1 * 11/2020 Venkatesan .............. G06N 5/01
2023/0205740 A1 6/2023 Abdelaal
2024/0070465 A1 2/2024 Abdelaal et al.
2024/0078473 A1 3/2024 Laszczuk et al.
(Continued)

FOREIGN PATENT DOCUMENTS

GB 2514165 A * 11/2014 ........ H03M 13/2948
WO WO-2020255137 A1 * 12/2020 ............. G06N 3/045

OTHER PUBLICATIONS

Abdelaal et al., U.S. Appl. No. 18/658,237, filed May 8, 2024.
(Continued)

*Primary Examiner* — Bai D Vu
(74) *Attorney, Agent, or Firm* — Nixon & Vanderhye, PC

(57) ABSTRACT

Certain example embodiments leverage counterfactuals to repair a dataset used in a downstream machine learning (ML) model. Features from the dataset stored are extracted, portion-by-portion. For each portion, an error detection algorithm identifies erroneous data instances in the dataset using the extracted features associated with the respective portion. For each identified erroneous data instance in each portion: a set of feature-space repair candidates is determined, with each having at least one change with respect to the extracted features associated with the respective erroneous data instance; for each feature-space repair candidate, a data-space repair candidate is generated by (a) finding a matching non-erroneous data instance within the respective portion, and (b) using one or more values from the match; a repaired instance is generated based on one or more of the data-space repair candidates; and the portion is updated to include the repaired instance rather than the respective erroneous data instance.

20 Claims, 13 Drawing Sheets

| Customer ID | Age | City | Monthly Spend | Satisfaction Level |
|---|---|---|---|---|
| 1 | 29 | New York | 200 | High |
| 2 | 35 | Los Angeles | -1 | Medium |
| 3 | | Chicago | 150 | Low |
| 4 | 42 | San Francisco | 220 | Medium |
| 5 | 31 | San Diego | 185 | High |

| Mean of all Customers | Group-based Mean (City) | Regression Model |
|---|---|---|
| Monthly Spend | Monthly Spend | Monthly Spend |
| 200 | 200 | 200 |
| 188 | 210 | 205 |
| 150 | 150 | 150 |
| 220 | 220 | 220 |
| 185 | 185 | 185 |

(56) References Cited

U.S. PATENT DOCUMENTS

2024/0346002 A1    10/2024    Abdelaal et al.

OTHER PUBLICATIONS

Sanjay Krishnan et al., "ActiveClean: Interactive Data Cleaning For Statistical Modeling" Proceedings of the VLDB Endowment, vol. 9, No. 12 (2016), pp. 1-12.

Anaconda Inc., 2022 State of Data Science Report, pp. 1-52.

Sanjay Krishnan et al., "BoostClean: Automated Error Detection and Repair for Machine Learning" arXiv:1711.01299v1, Nov. 3, 2017, pp. 1-15.

Benjamin Hilprecht et al., "DiffML: End-to-end Differentiable ML Pipelines" arXiv:2207.01269v2, Jul. 5, 2022, pp. 1-7.

Felix Neutatz et al., "ED2: Two-stage Active Learning for Error Detection—Technical Report" arXiv:1908.06309v1, Aug. 17, 2019, pp. 1-10.

Bojan Karla et al., "Nearest Neighbor Classifiers over Incomplete Information: From Certain Answers to Certain Predictions" arXiv:2005.05117v2, May 12, 2020, pp. 1-34.

Dieter Brughmans et al., "Nice: an Algorithm for Nearest Instance Counterfactual Explanations" a Preprint: arXiv:2104.07411v2, May 17, 2022, pp. 1-25.

Mohammad Mahdavi et al., "Raha: A Configuration-Free Error Detection System" Research 8: Data Integration/Cleaning; SIGMOD '19, Jun. 30-Jul. 5, 2019, pp. 865-882.

Mohamed Abdelaal et al., "Rein: A Comprehensive Benchmark Framework for Data Cleaning Methods in ML Pipelines" Experiments & Analysis Paper; Series ISSN: 2367-2005; pp. 499-511.

Tobias Clement et al., "Xair: A Systematic Metareview of Explainable AI (XAI) Aligned to the Software Development Process" Mach. Learn. Knowl. Extr. 2023, 5, pp. 78-108. https://doi.org/10.3390/make5010006.

Martin Pawelczyk et al., "Learning Model-Agnostic Counterfactual Explanations for Tabular Data" Apr. 20-24, 2020, Taipei, Taiwan; arXiv:1910.09398v2, pp. 1-10.

D. Randall Wilson et al., "Improved Heterogeneous Distance Functions" Journal of Artificial Intelligence Research 6 (1997) pp. 1-34.

UCI: Machine Learning Repository, Wine Quality Data Set, https://archive.ics.nei.edu/ml/datasets/wine+quality pp. 1-2.

CEML—Counterfactuals for Explaining Machine Learning models—A Python toolbox; https:www.github.com/andreArtelt/ceml pp. 1-5.

* cited by examiner

| Customer ID | Age | City | Monthly Spend | Satisfaction Level |
|---|---|---|---|---|
| 1 | 29 | New York | 200 | High |
| 2 | 35 | Los Angeles | -1 | Medium |
| 3 | | Chicago | 150 | Low |
| 4 | 42 | San Francisco | 220 | Medium |
| 5 | 31 | San Diego | 185 | High |

Mean of all Customers

| Monthly Spend |
|---|
| 200 |
| 188 |
| 150 |
| 220 |
| 185 |

Group-based Mean (City)

| Monthly Spend |
|---|
| 200 |
| 210 |
| 150 |
| 220 |
| 185 |

Regression Model

| Monthly Spend |
|---|
| 200 |
| 205 |
| 150 |
| 220 |
| 185 |

Fig. 1

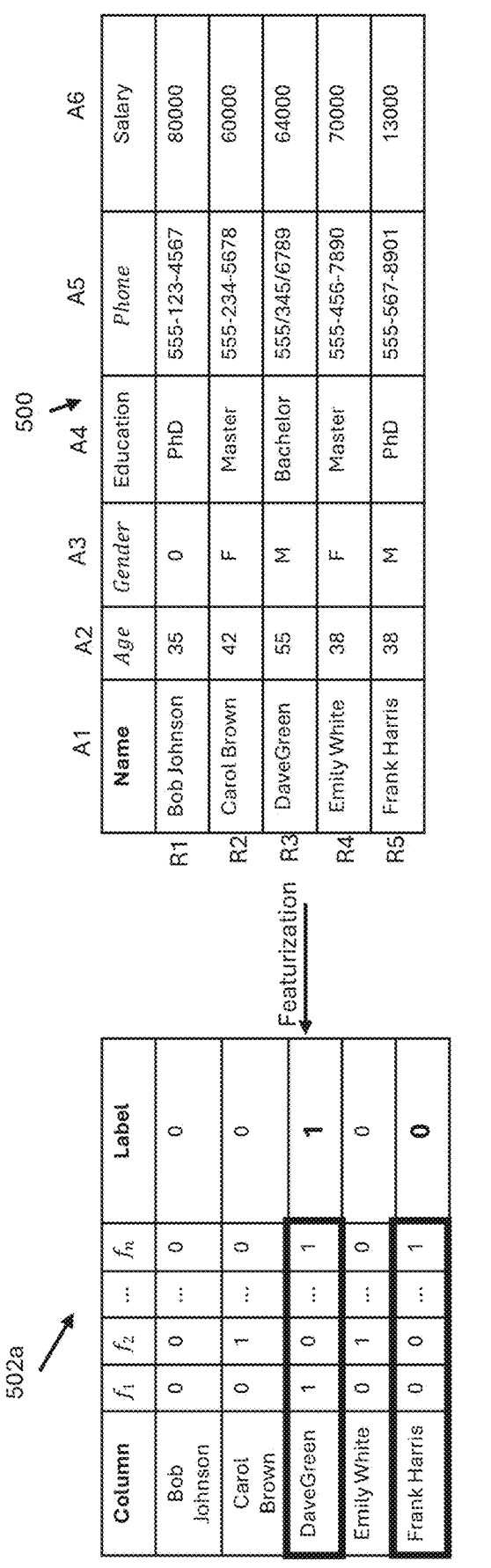
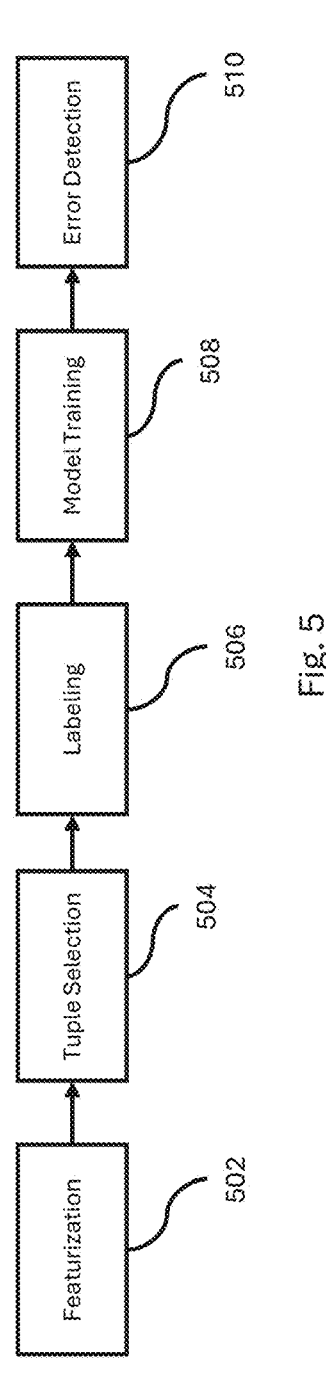
Fig. 5

1002a ― NICE  C1

1002b ― CEML  C2

1002c ― CCHVAE  C3

Mixture of repair alternatives $\delta_1 C1 + \delta_2 C2 + \delta_3 C3$

1004

Neural Network $(\theta)$ ― 1006

---

Figure 11:
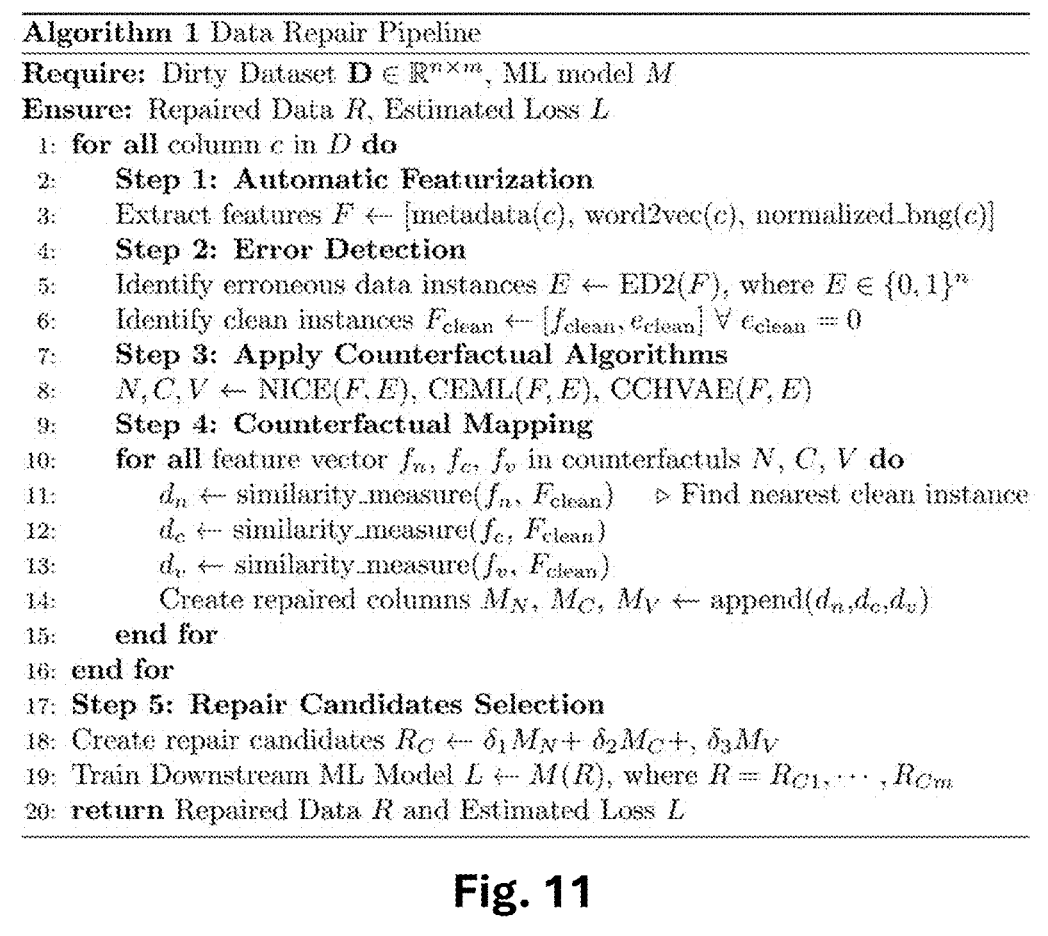

Algorithm 1 Data Repair Pipeline

---

Require: Dirty Dataset $\mathbf{D} \in \mathbb{R}^{n \times m}$, ML model $M$

Ensure: Repaired Data $R$, Estimated Loss $L$

1: for all column $c$ in $D$ do

2:      Step 1: Automatic Featurization

3:      Extract features $F \leftarrow [\text{metadata}(c), \text{word2vec}(c), \text{normalized\_bng}(c)]$ 4:      Step 2: Error Detection

5:      Identify erroneous data instances $E \leftarrow \text{ED2}(F)$, where $E \in \{0,1\}^n$ 6:      Identify clean instances $F_{\text{clean}} \leftarrow [f_{\text{clean}}, e_{\text{clean}}] \; \forall \; e_{\text{clean}} = 0$ 7:      Step 3: Apply Counterfactual Algorithms

8:      $N, C, V \leftarrow \text{NICE}(F, E), \text{CEML}(F, E), \text{CCHVAE}(F, E)$ 9:      Step 4: Counterfactual Mapping

10:      for all feature vector $f_n$, $f_c$, $f_v$ in counterfactuls $N$, $C$, $V$ do

11:         $d_n \leftarrow \text{similarity\_measure}(f_n, F_{\text{clean}})$    ▷ Find nearest clean instance 12:         $d_c \leftarrow \text{similarity\_measure}(f_c, F_{\text{clean}})$ 13:         $d_v \leftarrow \text{similarity\_measure}(f_v, F_{\text{clean}})$ 14:         Create repaired columns $M_N$, $M_C$, $M_V \leftarrow \text{append}(d_n, d_c, d_v)$ 15:      end for

16: end for

17: Step 5: Repair Candidates Selection

18: Create repair candidates $R_C \leftarrow \delta_1 M_N + \delta_2 M_C +, \delta_3 M_V$ 19: Train Downstream ML Model $L \leftarrow M(R)$, where $R = R_{C1}, \cdots, R_{Cm}$ 20: return Repaired Data $R$ and Estimated Loss $L$

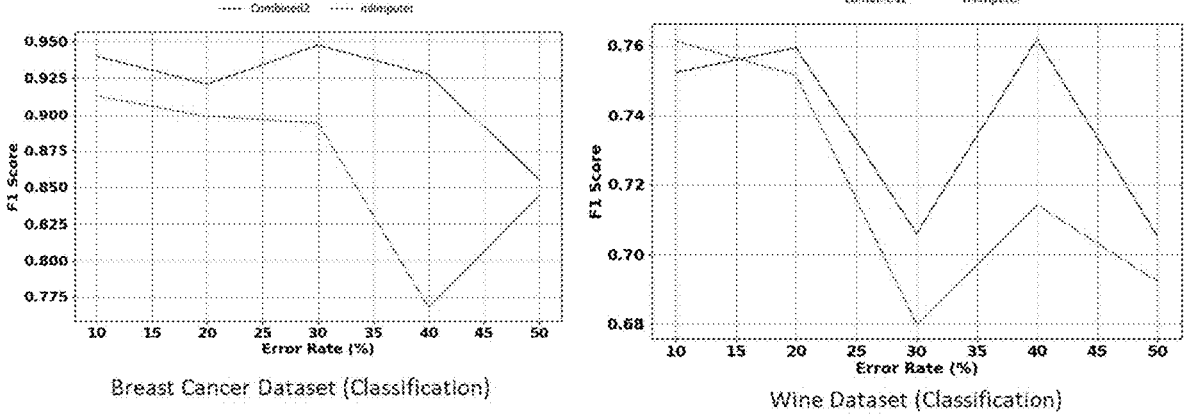
Breast Cancer Dataset (Classification)
Wine Dataset (Classification)
Fig. 13A          Fig. 13B

SYSTEMS AND/OR METHODS FOR AUTOMATED REPAIR OF DATA USED IN MACHINE LEARNING MODELS VIA COUNTERFACTUAL GENERATION AND MAPPING

TECHNICAL FIELD

Certain example embodiments described herein relate to systems and/or methods for repairing datasets used as inputs to machine learning (ML) models. More particularly, certain example embodiments described herein relate to systems and/or methods generate counterfactuals in automatically repairing erroneous data points detected by ML-based error detection tools, while also considering the effect on downstream ML models in connection with the repair.

BACKGROUND AND SUMMARY

Data preparation is a significant part of the machine learning pipeline, often consuming the largest amount of a data scientist's time compared to other ML pipeline operations. Data preparation refers generally to the process of preprocessing the datasets before being used as inputs to predictive models. It may include operations such as data annotation, data cleaning, data transformations, feature extractions. In fact, according to the Anaconda's 2022 State of Data Science Report, data professionals dedicate approximately 37.75% of their time to data preparation and cleansing. As will be appreciated by those skilled in the art, data cleaning relates to the process of detecting and repairing erroneous samples in a dataset and is sometimes referred to as data cleansing or data curation. Data quality directly impacts the performance and reliability of ML models; therefore, data preparation takes on a heightened importance in many ML applications. Indeed, inaccurate or inconsistent data can lead to biased or erroneous outcomes, rendering the entire modeling effort futile.

Improvements to (e.g., via automation of) data preparation steps, such as data cleaning, transformation, and feature engineering, are beneficial for several reasons. First, automation can significantly reduce the time and effort required to prepare data for model training, freeing up data professionals for more valuable tasks such as data visualization (currently only 12.99% of their time according to the study mentioned above) and demonstrating data's value (currently only 16.20% of their time according to the study mentioned above). Second, automation can reduce the risk of human error, ensuring greater consistency and accuracy in the data. Third, automation can allow data scientists to focus on higher-level tasks like model selection, hyperparameter tuning, and result interpretation, ultimately leading to more efficient and effective ML workflows.

Numerous tools for automating parts or all of the data preparation process exist in academia and industry. Unfortunately, however, many automated data cleaning tools fail to consider the downstream impact of repaired data on ML models. This oversight can negatively affect the performance of these models. Consider the example illustrated in FIG. 1, which depicts a dataset containing customer age, city, and monthly spend used to predict customer satisfaction. The circled cells highlight erroneous data points (including a missing value, an invalid monthly spend amount, and a typographical error in city name). Several repair strategies could be employed. For example, a repair strategy could involve imputing missing values with the global mean, using group-based means, or making predictions from a trained regression model. Yet each approach yields different repaired values, and selecting the optimal strategy for downstream ML model performance is not straightforward. That is, it is not always clear which approach should be used to ensure good downstream ML model performance, as a downstream ML model refers to a model that is used for a specific task or application after the training process has been completed and typically operates within a defined framework and performs specialized tasks such as, for example, image recognition, natural language processing, and recommendation systems. Blindly applying automated data repair tools can therefore be detrimental, potentially harming rather than improving predictive performance. Furthermore, many of these approaches, particularly those leveraging ML models, often lack interpretability, making it challenging for users to understand and trust the automated detection and repair decisions.

There are ML-oriented data cleaning tools, such as Iterative Cleaning, reinforcement learning-based data cleaning, ActiveClean, BoostClean, and CPClean. In general, these approaches concentrate on selecting or combining existing data repair tools to enhance the predictive performance of downstream ML models. Data repair in this sense refers generally to the process of replacing erroneous data samples with generated values close to "ground truth." Instead of replacing the erroneous samples, some strategies opt for omitting them, such as the duplicates cleaner and some outlier repair methods. Error detectors in general will traverse the entire dataset searching for erroneous data samples, and error detection can be either a one-shot process or an iterative process. FIG. 2 shows an example data cleaning pipeline while using ActiveClean (as an example current approach) and helps demonstrate the need for executing multiple repair tools before executing ActiveClean. As shown in FIG. 2, current tools typically detect errors 202, one a plurality of repair tools 204a-204n, and then run the ML-based approach 206. Although FIG. 2 uses ActiveClean as a specific example, the above-listed tools all generally rely on external data repair methods to perform the actual repair actions, rather than executing repairs independently. Furthermore, they lack the capability to analyze and interpret the detection decisions made by ML-based error detectors, which is beneficial when trying to understand the underlying data quality issues.

Another recent approach provides an end-to-end ML framework that integrates various components, including exploratory data analysis, feature engineering, model training using AutoML algorithms, generation of local and global explanations, visualization of predictions, and selection of the best-trained model. This approach leverages the XAI tool SHAP to estimate feature importance, informing the selection of relevant features during model training. It will be appreciated, however, that this approach involves a distinct and complementary aspect of the ML pipeline, unlike certain example embodiments that focus on error detection and data repair.

As will be appreciated from the above, data cleaning current solutions have several technical limitations that hinder their widespread adoption. For example, these methods often rely on external repair tools that need to be executed repeatedly during the data cleaning process, leading to increased computational overhead and complexity. Furthermore, many of these tools have a narrow scope, at least insofar as they are designed to work with specific ML models or tasks, such as regression or classification. ActiveClean, for instance, is a prominent data cleaning approach that focuses on binary classification problems, restricting its applicability to more general ML tasks.

Certain example embodiments help address the above-described and/or other concerns.

One aspect of certain example embodiments relates to using counterfactuals as an automated repair method, e.g., for tabular data. More particularly, certain example embodiments leverage counterfactual explanations to perform data repair actions autonomously. By using counterfactuals, certain example embodiments can analyze the detection decisions made by ML-based error detectors and generate repaired data points that are optimized for downstream ML tasks. This approach advantageously reduces or eliminates the need for external data repair tools and enables a more transparent and interpretable data cleaning process.

Another aspect of certain example embodiments applies counterfactuals to enhance the data repair process, thereby improving the overall quality and reliability of the data used for downstream ML tasks. By targeting data cleaning and counterfactual-driven repair, certain example embodiments provide a foundational technical framework for ensuring the accuracy and trustworthiness of ML models.

Certain example embodiments provide a number of technical advantages, solving technical problems associated with data cleaning used in connection with ML models. For example, certain example embodiment provide for autonomous repair candidate generation, e.g., by directly generating repair candidates for erroneous data points without having to rely on external data repair tools. This aspect advantageously eliminates the need for repeated executions of external tools, reducing computational overhead and simplifying the data cleaning process. Another technical advantage relates to ML task agnosticism, in that certain example embodiments are not limited to specific ML models or tasks and can be seamlessly integrated with any downstream ML task, including regression, classification, and beyond. This flexibility makes the approach of certain example embodiments a versatile solution for a wide range of data cleaning applications. Still another advantageous aspect of certain example embodiments relates to the ability to provide configuration-free operation in the sense that certain example embodiments can automatically generates various counterfactuals for each erroneous data point without requiring user-defined parameters or configurations. This configuration-free approach simplifies the data cleaning process, reducing the burden on users and minimizing the risk of human error.

By addressing the limitations of existing data cleaning approaches, certain example embodiments offer a more efficient, flexible, and user-friendly solution for data cleaning, making it an attractive choice for a wide range of applications.

In certain example embodiments, a system for repairing a dataset to be used in a downstream machine learning model is provided. An interface to a data store is configured to store the dataset. A memory is provided, and at least one processor is configured to perform operations comprising extracting features from the dataset stored to the data store, on a portion-by-portion basis. For each portion an error detection algorithm is applied to identify erroneous data instances in the dataset using the extracted features associated with the respective portion. For each identified erroneous data instance: a set of feature-space repair candidates including a plurality of feature-space repair candidates is determined, with each feature-space repair candidate in the set of feature-space repair candidates having at least one change with respect to the extracted features associated with the respective erroneous data instance; for each feature-space repair candidate, a data-space repair candidate is generated by (a) finding a matching non-erroneous data instance within the respective portion, and (b) using one or more values from the matching non-erroneous data instance in lieu of one or more corresponding values in the respective erroneous data instance; a repaired instance is generated based on one or more of the data-space repair candidates; and the portion is updated to include the repaired instance rather than the respective erroneous data instance, in repairing the data in the data store.

In certain example embodiments, a method for repairing a dataset to be used in a downstream machine learning model is provided. The method comprises extracting features from the dataset on a portion-by-portion basis; and for each portion: applying an error detection algorithm to identify erroneous data instances in the dataset using the extracted features associated with the respective portion; and for each identified erroneous data instance: determining a set of feature-space repair candidates including a plurality of feature-space repair candidates, each feature-space repair candidate in the set of feature-space repair candidates having at least one change with respect to the extracted features associated with the respective erroneous data instance; for each feature-space repair candidate, generating a data-space repair candidate by (a) finding a matching non-erroneous data instance within the respective portion, and (b) using one or more values from the matching non-erroneous data instance in lieu of one or more corresponding values in the respective erroneous data instance; generating a repaired instance based on one or more of the data-space repair candidates; and updating the portion to include the repaired instance rather than the respective erroneous data instance, in repairing the data in the data store.

In certain example embodiments, a non-transitory computer readable storage medium tangibly storing instructions that, when executed by at least one processor, perform operations corresponding to the method specified in the prior paragraph and/or otherwise disclosed herein.

In accordance with certain example embodiments, the extracted features may include metadata, one or more semantic embeddings, and/or one or more statistical representations related to the data in the data store.

In accordance with certain example embodiments, the error detection algorithm may be an ML-based error detector.

In accordance with certain example embodiments, a plurality of error detection algorithms may be applied in the identification of the erroneous data instances in the dataset.

In accordance with certain example embodiments, the application of the error detection algorithm may assign a label to each data instance in each portion, e.g., with the label identifying whether the associated data instance is an erroneous data instance or a clean data instance.

In accordance with certain example embodiments, matching non-erroneous data instances may be located by finding a nearest neighbor, e.g., based on a similarity metric.

In accordance with certain example embodiments, the generation of a given repaired instance based on one or more corresponding data-space repair candidates may comprise assigning a weight to each corresponding data-space repair candidate, e.g., with the weight indicating a potential contribution of the associated data-space repair candidate to performance of the ML model. Further, in accordance with certain example embodiments, the generation of the given repaired instance may further comprise: assigning a weight to each corresponding data-space repair candidate, the weight indicating a potential contribution of the associated data-space repair candidate to performance of the ML model; in response to the assigned weights indicating that there is a single best corresponding data-space repair candidate, using the single best corresponding data-space repair candidate as the given repaired instance; and in response to the assigned weights indicating that there is not a single best corresponding data-space repair candidate, combining the corresponding data-space repair candidates in accordance with their assigned weights in generating the given repaired instance.

In accordance with certain example embodiments, the feature-space repair candidates may be generated as counterfactuals, e.g., such that each counterfactual represents a minimal set of changes to the feature(s) of the associated erroneous data instance that would change output from the error detection algorithm from erroneous to clean.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a data repair example showing different techniques to replace the dirty instance of the "Monthly Spend" column;

FIG. 5 shows steps involved in a typical ML-based error detection tool that processes data for relational data, e.g., on a column-by-column basis;

FIG. 11 is pseudocode explaining the data repair pipeline of certain example embodiments;

6

Figure 2:
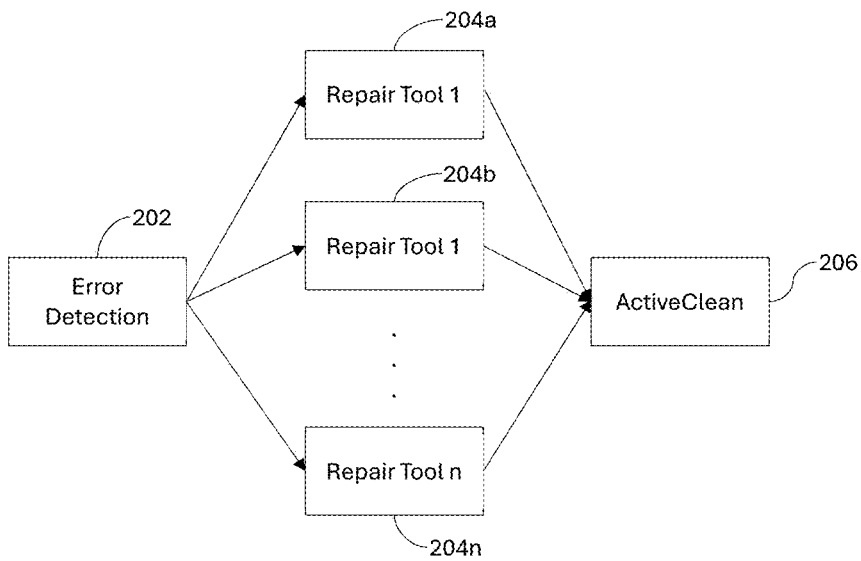
FIG. 2 shows an example data cleaning pipeline while using ActiveClean (as an example current approach) and helps demonstrate the need for executing multiple repair tools before executing ActiveClean.

FIGS. 13A-13B are graphs comparing the performance of certain example embodiments and a baseline method.

DETAILED DESCRIPTION

To address the challenges of effectively automating data repair while considering downstream ML model performance, certain example embodiments introduce a novel approach that leverages the power of explainable AI (XAI) for tabular data preparation. XAI refers to a set of techniques, methods, and tools that aim to provide insights into the decision-making process of ML models. XAI in general seeks to make AI systems more transparent through providing explanations for their predictions, recommendations, and actions. Certain example embodiments make use of counterfactual explanations to analyze and repair erroneous data points identified by ML-based error detection tools. Counterfactuals are essentially "what-if" scenarios that help explore how an outcome might have been different if a particular event or condition had been altered. Unlike traditional automated data cleaning tools, which often fail to account for the impact of repaired data on downstream ML models, certain example embodiments help ensure that the repaired data is well-suited for subsequent predictive tasks.

In contrast to traditional XAI applications that primarily focus on understanding model behavior and decision-making, certain example embodiments employ counterfactuals for data repair. For each erroneous data point flagged by an ML-based detector, certain example embodiments generate counterfactual instances by minimally altering feature values to "flip" the detector's decision from "dirty" to "clean." As will be appreciated by those skilled in the art, dirty data refers to low-quality data samples that contain one or more error types. Examples of error types include duplicates, outliers, constraint/rule violations, implicit missing values, explicit missing values, inconsistences, typos, formatting issues, and mislabeling. In contrast, clean data refers to high-quality data samples lacking error profiles. These samples generally will achieve a set of application-relevant quality metric such as completeness, accuracy, timeliness, uniqueness, and consistency. The counterfactuals generated by certain example embodiments, representing plausible repaired versions of the original erroneous data, are then evaluated in the context of the downstream ML task. This approach shifts the focus of XAI from mere explanation to actionable data repair, ensuring that the repaired data aligns with both the detector's criteria and the requirements of the downstream ML model.

Thus, it will be appreciated that certain example embodiments advantageously leverage counterfactuals to directly repair erroneous data points detected by ML-based error detection tools. Because the input to the counterfactual method is a set of features representing the erroneous data points, the output will be a modified version of the features. Therefore, certain example embodiments employ a counterfactual mapping approach (e.g., using the nearest neighbor search algorithm in some instances) implemented to map the counterfactuals from the feature space to the original data space as described in greater detail below. Furthermore, because counterfactuals are or can be generated for each erroneous data point, certain example embodiments also comprise a counterfactual selection approach that iteratively identifies the counterfactual well-suited for a certain downstream ML model. Certain example embodiments may be implemented in Python, for example, and applied to real-world datasets originating from different domains. The results show that the approach disclosed herein has comparable or even better performance than a ML-based baseline tool.

Technical Overview

The following sections provides exemplary overviews of certain technical concepts underlying example embodiments. That is, the following sections include discussions regarding counterfactuals, ML-based error detectors, and the operation of counterfactuals-based error repair in accordance with certain example embodiments.

Example Overview of Counterfactuals

The following section provides an exemplary overview of counterfactuals. In typical ML pipelines, the input data is used to train an ML model, which generates predictions that can be used by various stakeholders. To facilitate understanding and trust in these predictions, XAI methods are employed to provide insights into the decision-making process of the model. These explanations can be particularly valuable in high-stakes applications, where model interpretability is crucial. However, with prominent explanation tools, there exists a fundamental tradeoff between model complexity and interpretability. Traditional ML models, such as linear regression, decision trees, and support vector machines, exhibit high explainability and low complexity, making them more transparent and easier to understand. In contrast, deep learning models, which have demonstrated superior performance in many tasks, are often characterized by high complexity and low interpretability, rendering them more challenging to comprehend.

XAI tools come into play by helping to bridge the gap between model performance and interpretability. By leveraging XAI techniques, it becomes possible to harness the high performance of deep learning models while improving their interpretability, thereby increasing trust and confidence in the predictions generated. This can be particularly important in applications where model explainability is essential, such as healthcare, finance, and law. In this context, certain example embodiments, which use counterfactual explanations to improve data cleaning, can be seen as a valuable contribution to the XAI landscape. By providing insights into the decision-making process of ML-based error detectors, for example, the approach of certain example embodiments can help stakeholders better understand the data cleaning process and increase trust in the resulting data quality.

Figure 3:
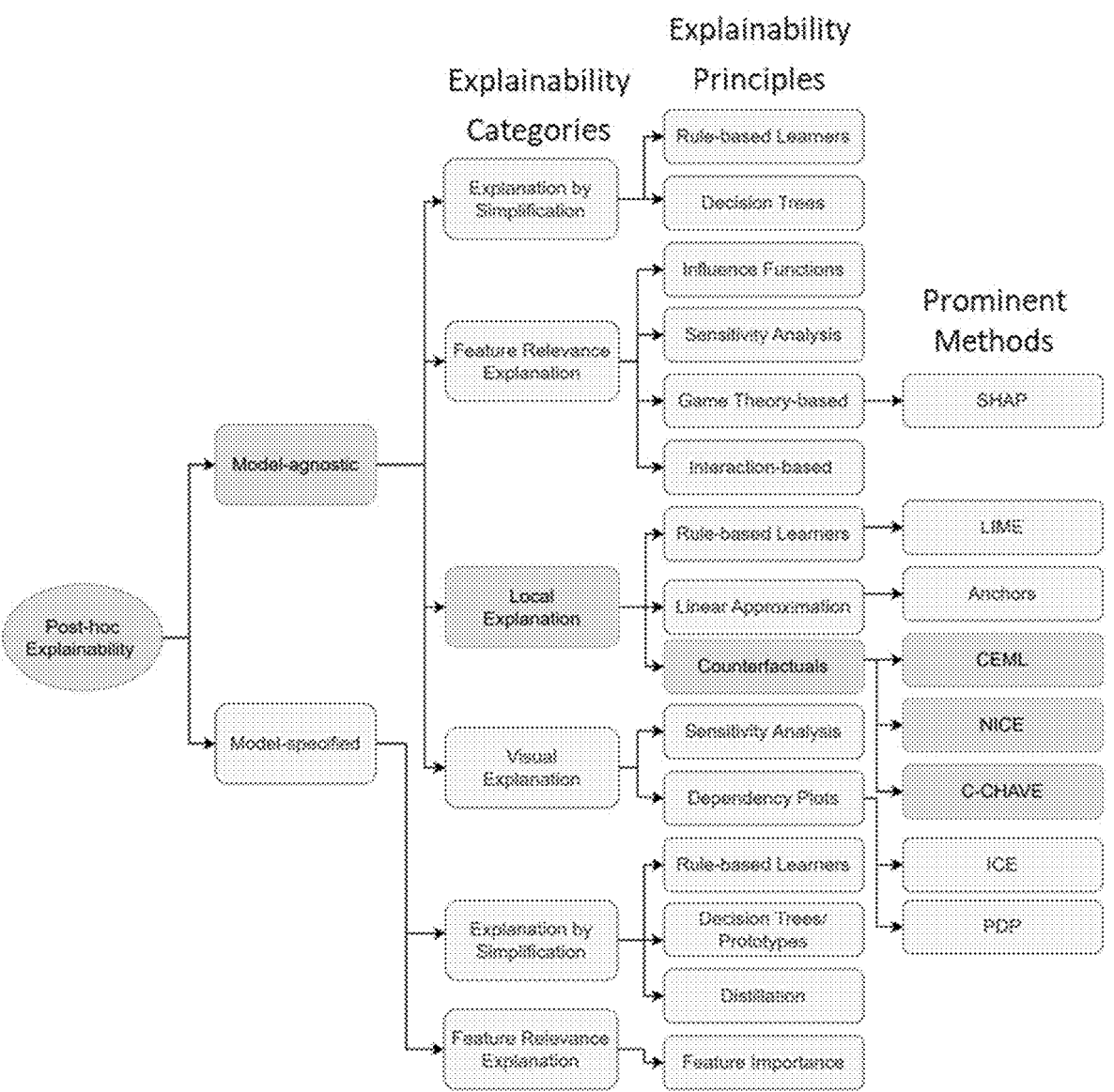
FIG. 3 is a classification of explanation methods showing counterfactuals as a model-agnostic method that provides local explanations.

Indeed, the landscape of XAI methods is diverse and multifaceted. As illustrated in FIG. 3, XAI tools can be broadly categorized into two primary types: model-agnostic and model-specific. Model-agnostic methods are particularly valuable, as they can be applied to various ML models, regardless of their architecture or type. That is, model-agnostic XAI refers generally to a class of techniques and methods that can be applied to any ML model, regardless of (for example) its architecture, type, or complexity, to provide insights into its decision-making process. Within the model-agnostic category, there exist several subcategories, including local explanations. Local explanations focus on providing insights at the individual data instance level, rather than at the dataset level. That is, local explanations are a type of model interpretability technique used to understand how an ML model makes predictions for a specific instance or a small group of instances. Local explanations in general are contrastable with global explanations, which are used to understand how an ML model makes predictions across the entire dataset, where they aim to describe the overall behavior of a model, providing insights into its decision-making process and relationships between features. Local explanations can be particularly useful in applications where understanding the model's decision-making process for specific instances is beneficial. Counterfactuals are a type of local explanation and are able to provide actionable and interpretable explanations.

As indicated above, counterfactuals can be viewed as "what if" scenarios that explore alternative outcomes to events that have already occurred. Rather than providing explanations for why a particular data point led to a certain decision, counterfactuals offer suggestions on how to alter the decision made by the ML model by making minimal changes to the input features. To illustrate this concept, consider the example depicted in FIG. 4. In this example, there is a binary classifier that determines whether a loan application should be approved or not based on the applicant's income. The decision boundary (i.e., white curve 402) between the two possible decisions, i.e., loan (the upper region 404) and no-loan (the lower region 406), is clearly shown. Now, for the purposes of this example, suppose there is an applicant x whose application landed in the no-loan region. By applying counterfactuals, it is possible to modify the input features to alter the decision made by the binary classifier.

Figure 4:
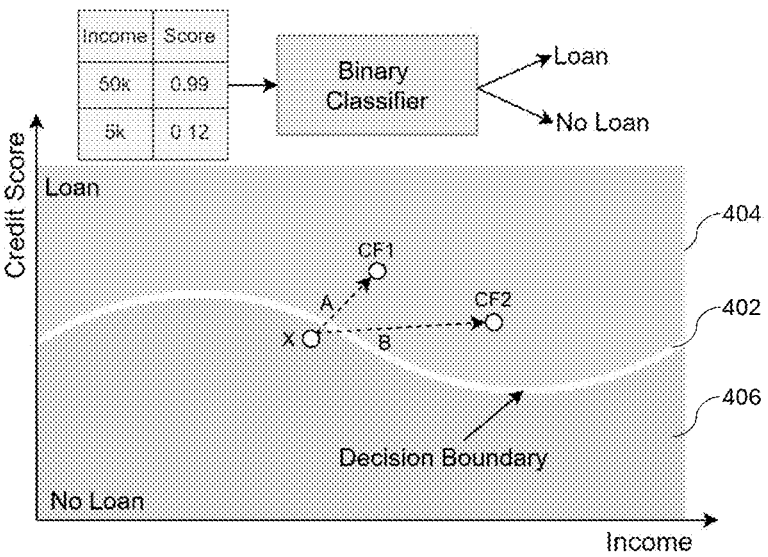
FIG. 4 is an example showing a decision boundary of a ML classifier that makes a binary prediction.

As shown in FIG. 4, two different counterfactual methods, A and B, can be applied to generate two distinct counterfactuals, CF1 and CF2, respectively. Both counterfactuals represent alternative scenarios that, if realized, would result in the binary classifier changing its decision from no-loan to loan. Thus, it will be appreciated that counterfactuals can provide actionable recommendations on how to modify the input features to achieve a desired outcome, rather than simply explaining why a particular decision was made.

In the context of certain example embodiments, counterfactuals help in identifying the minimal changes required to repair erroneous data points. By generating counterfactuals that alter the decision made by the ML-based error detector, it becomes possible to effectively repair data points that were previously classified as erroneous, thereby improving the overall data quality. To this end, three distinct counterfactual methods may be implemented. Each counterfactual method represents a different approach to generating counterfactuals. These methods include:

1. Nearest Instance Counterfactual Explanations (NICE): This method generates counterfactuals by identifying the most relevant features that contribute to the model's prediction. NICE is a model-agnostic approach that relies on distance-based metrics to identify the nearest unlike neighbor, ensuring 100% coverage of the data. One advantage of NICE relates to its ability to quickly generate counterfactuals, making it a valuable tool for real-time applications. See, for example, D. Brughmans, P. Leyman and D. Martens, "Nice: an algorithm for nearest instance counterfactual explanations," *Data mining and knowledge discovery*, pp. 1-39, 2023—the entire contents of which are hereby incorporated herein by reference.

2. Counterfactual Explanation for Machine Learning models (CEML): This approach generates counterfactuals by minimizing the loss function of the model, while ensuring that the resulting counterfactual is realistic and plausible. CEML is a model-agnostic method that uses optimization-based techniques to minimize the deviation from the desired prediction while minimizing changes from the original input. This approach has a high probability of generating counterfactuals, making it a reliable choice for a wide range of applications. See, for example, A. Artelt, "CEML: Counterfactuals for Explaining Machine Learning model," 2019. [Online]. Available: https://www.github.com/andreArtelt/ceml. [Accessed 3 Jan. 2024]—the entire contents of which are hereby incorporated herein by reference.

3. Counterfactual Conditional Heterogenous Variational Autoencoder (CCHVAE): This method uses a probabilistic approach to generate counterfactuals, modeling the underlying distribution of the data and identifying the most likely counterfactual explanations. CCHVAE is a model-agnostic approach that perturbs the original data in the latent space to generate counterfactuals. While this method has a high probability of generating counterfactuals, it is less time-efficient than other algorithms, making it more suitable for applications where computational resources are not a concern. See, for example, M. Pawelczyk, K. Broelemann and G. Kasneci, "Learning Model-Agnostic Counterfactual Explanations for Tabular Data," in *Proceedings of the web conference* 2020, New York, 2020—the entire contents of which are hereby incorporated herein by reference.

It will be appreciated that one or more of these and/or other counterfactual methods may be used in different example embodiments. By leveraging counterfactual methods, certain example embodiments provide a comprehensive and robust approach to data cleaning, one that can effectively identify and repair erroneous data points while providing actionable insights into the decision-making process of the ML-based error detectors.

Example Overview of How ML-Based Error Detectors Operate

FIG. 5 shows steps involved in a typical ML-based error detection tool that processes data for relational data, e.g., on a column-by-column basis. Relational data is data stored in a table or a set of tables (or like data structure), where the data 500 is organized in the form of rows (also sometimes referred to as records) and columns (also sometimes referred to as attributes or features), or a logically equivalent data structure. The FIG. 5 process initiates with feature extraction or featurization 502, where a set of descriptive attributes 502a are derived from the content of each column. These features encapsulate various characteristics of the data, such as statistical properties, patterns, and distributions, which are crucial for identifying potential anomalies or errors. Output from example featurization 502 is shown in FIG. 5, as well. An automated tuple selection mechanism 504 identifies a subset of tuples for labeling 506, which may be performed by one or more experts. The tuple selection mechanism 504 helps balance the trade-off between labeling effort and model performance. The selected tuples serve as the foundation for creating a labeled dataset, which is instrumental in training the ML classifier. An example of labeled data is provided in FIG. 5, as well. The labeled data is then used to train an ML classifier via model training 508 (which building off the FIG. 4 example is a binary classifier), typically employing supervised learning techniques, and error detection 510 is performed.

Once trained, the classifier generates predictions for the remaining unlabeled tuples, effectively extending the error detection process to the entire dataset. This workflow encompasses several components: featurization, tuple selection, labeling, model training, and error detection. While this general structure is common across various ML-based error detection tools, the implementation of each component can differ significantly among different approaches. For instance, RAHA implements featurization by leveraging the outputs of multiple error-specific tools as features. In the tuple selection phase, RAHA employs a clustering approach, aiming to select representative samples from different data subgroups. Conversely, the meta learning-based error detection tool described in U.S. Publication No. 2023/0205740 (which is hereby incorporated herein by reference in its entirety) implements an active learning strategy, dynamically selecting the most informative tuples for labeling.

Example Overview of Counterfactuals-Based Error Repair

As will be appreciated from the description above, certain example embodiments leverage the power of counterfactuals to transition from merely identifying errors to actively suggesting plausible repairs. Certain example embodiments begin by generating a comprehensive feature set for each input tuple. This set can incorporate diverse feature types including, for example, semantic embeddings like Word2Vec, statistical representations like TFIDF, and domain-specific metadata. This multi-faceted feature representation provides a holistic view of the data, enabling more nuanced and effective error detection and repair in some instances.

Certain example embodiments implement counterfactual generation techniques to identify minimal changes to the input features that would lead the error detection model to change its prediction from "True" (i.e., erroneous) to "False" (i.e., clean). These changes, encoded within the generated counterfactuals, represent potential repairs for the identified errors. However, this approach presents technical challenges, including counterfactual mapping and optimal counterfactual selection. First, counterfactuals exist in the feature space, necessitating a mechanism to map them back to the original data space and generate concrete repair candidates. This mapping preferably is accurate and interpretable, ensuring the generated candidates are both plausible and meaningful in the context of the original data. To this end, certain example embodiments implement a nearest neighbor search algorithm for counterfactual mapping.

Figure 6:
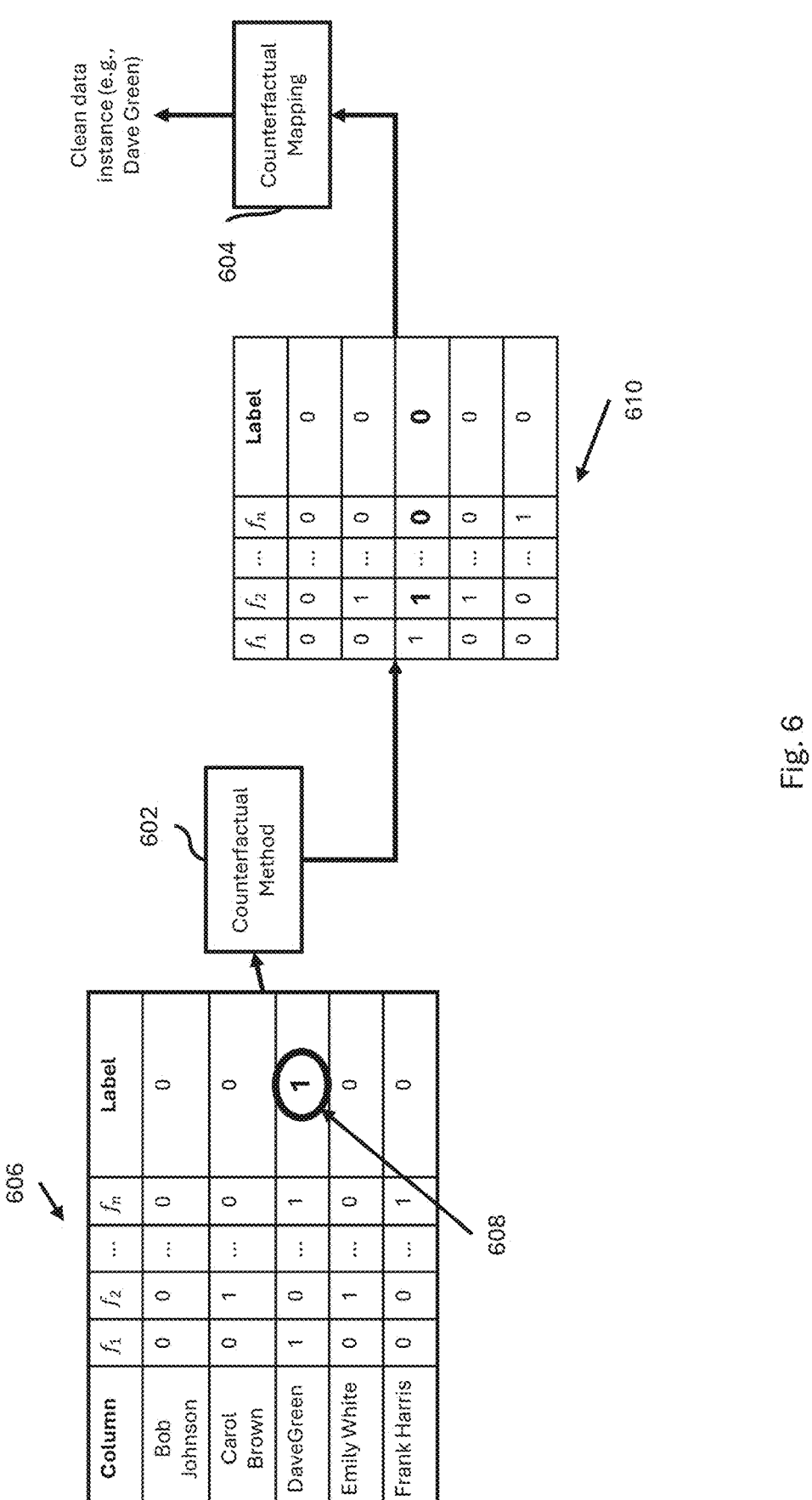
FIG. 6 is an example showing a counterfactual method that updates a dirty data instance, before performing a counterfactual mapping operation, in accordance with certain example embodiments.

FIG. 6 is an example showing a counterfactual method 602 that updates a dirty data instance (which may be a dirty tuple), before performing counterfactual mapping operation 604, in accordance with certain example embodiments. In this case, FIG. 6 depicts an example of counterfactual method 602 that updates a feature vector 606, with a dirty data instance whose initial label 608 was 1 (or some other value indicating the presence of an error) because of a typographical error in the name "DaveGreen" (in this case, the lack of a space between first name and last name). After generating the updated feature vector 610, the counterfactual mapping operation 604 is used to retrieve a repaired data point ("Dave Green" in this case) and generate a clean data instance, which in this case is the name "Dave Green." (and update the label accordingly).

Figure 7:
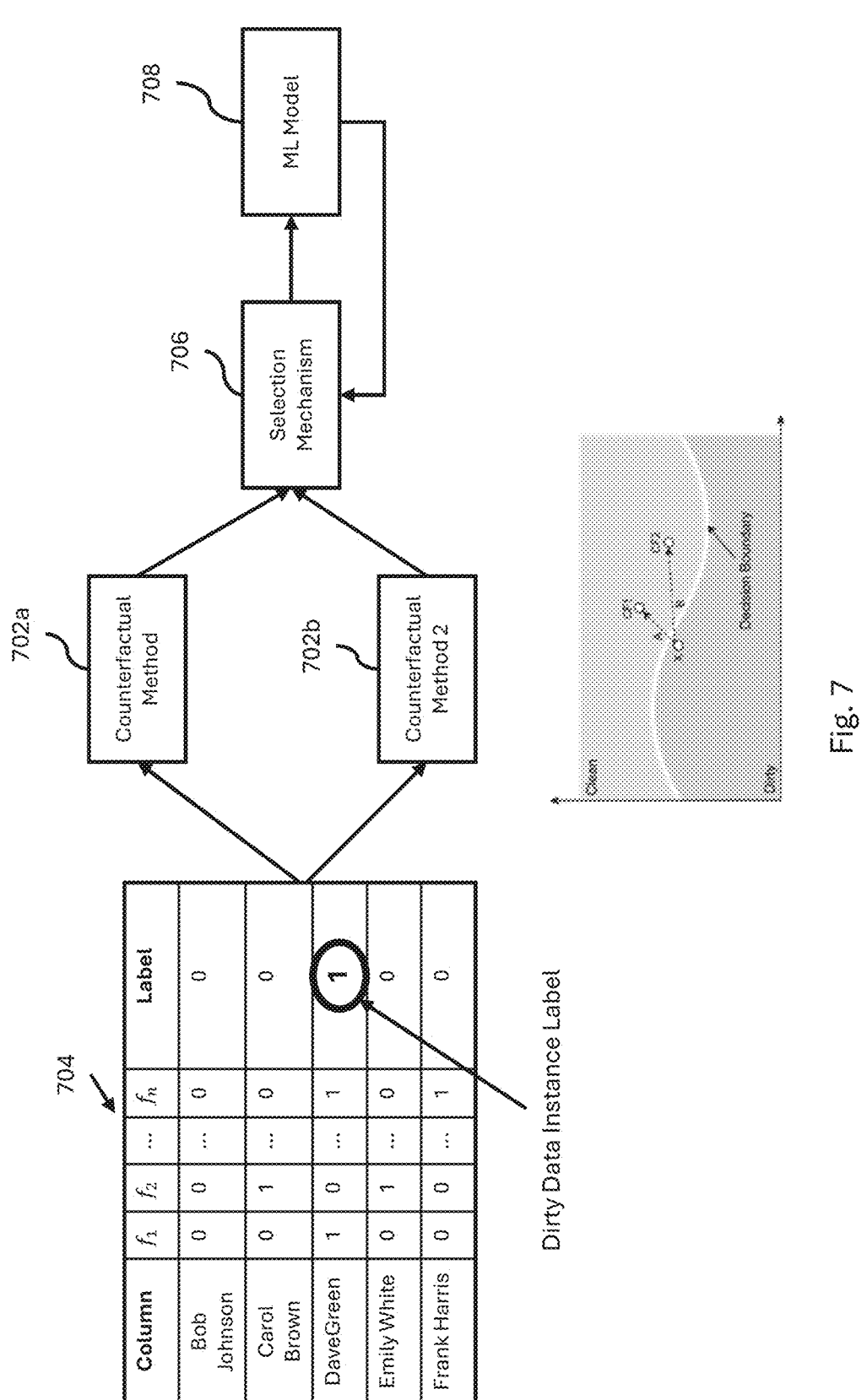
FIG. 7 illustrates the process of applying two different counterfactual methods to modify an input feature vector in accordance with certain example embodiments.

Another technical challenge lies in how to select the optimal counterfactual method. Different counterfactual generation methods may exhibit varying performance in terms of the accuracy and plausibility of the generated repairs. Therefore, selecting the most suitable counterfactual method for a given dataset and error type is beneficial for achieving optimal repair quality. FIG. 7 illustrates the process of applying two different counterfactual methods 702a-702b to modify an input feature vector 704 in accordance with certain example embodiments. The selection mechanism 706 evaluates the impact of these counterfactuals 702a-702b on a downstream ML model 708 to determine which counterfactual to select or whether to combine both. Although two counterfactual generation methods are shown schematically in FIG. 7, it will be appreciated that more than two counterfactual generation methods may be used in different example embodiments. Further details of this approach are provided below.

Figure 8:
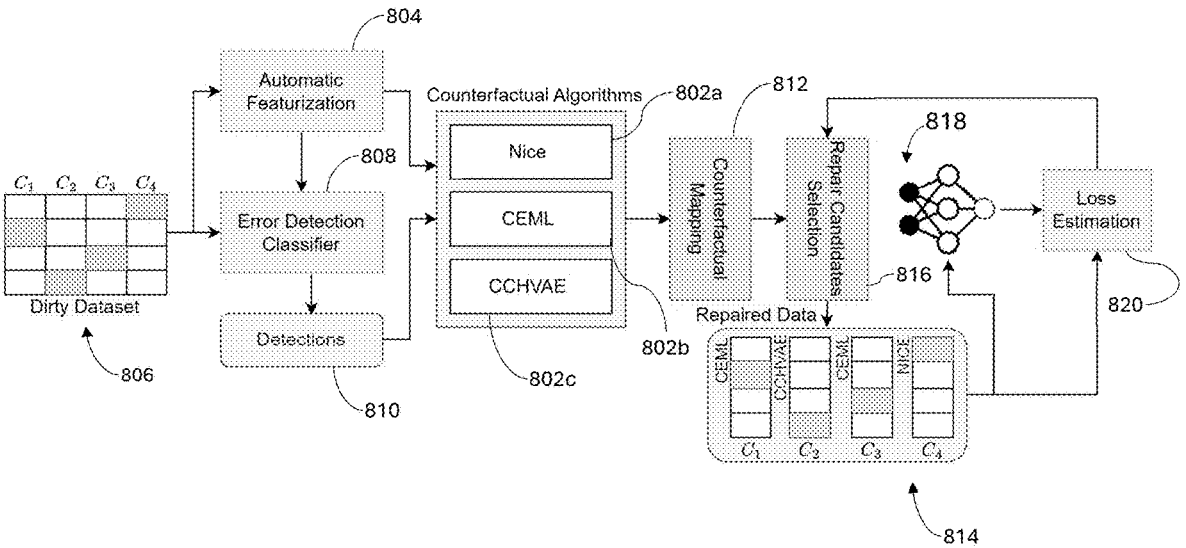
FIG. 8 is a block diagram illustrating a data repair method utilizing counterfactual explanations generated by three distinct counterfactual algorithms, in accordance with certain example embodiments.

FIG. 8 is a block diagram illustrating a data repair method utilizing counterfactual explanations generated by three distinct counterfactual algorithms, in accordance with certain example embodiments. In the FIG. 8 example, counterfactual algorithms 802a-802c correspond to NICE, CEML, and CCHVAE. The pipeline commences with an automatic featurization operation 804 applied to the input dirty dataset 806, enabling the error detection classifier 808 to identify potentially erroneous records 810. Upon identifying a potential error, the corresponding feature vector is fed into each of the counterfactual algorithms 802a-802c. These algorithms 802a-802c, operating independently of one another, generate counterfactual candidates by minimally perturbing the input feature vector while aiming to flip the predicted label from erroneous to clean.

The generated counterfactuals, along with the original feature vector, are then passed to a counterfactual mapping module 812. This counterfactual mapping module 812 translates the counterfactuals from the feature space back into the original data space, resulting in a set of repaired data candidates 814. A selection mechanism 816, leveraging the impact of these candidates on a downstream ML model 818, determines the most suitable repair candidate from among the set of repaired data candidates 814. This selection mechanism 816 considers the performance of the downstream model 818 on the repaired data via loss estimation 820. The chosen repair is then used to update the original database record, effectively mitigating the impact of the initial error.

This multi-faceted approach leverages the strengths of different counterfactual algorithms, allowing for a comprehensive exploration of potential repairs. The integration of a downstream model into the selection process helps ensure that the chosen repair not only corrects the identified error but also aligns with the overall objectives of the data-driven task for which the database is intended.

Example Implementation

Further details regarding an example implementation are set forth below. It will be appreciated that the details provided below regarding implementation language, code/pseudo-code, featurization methods, counterfactual generation methods, match-finding techniques, etc., are provided by way of example and without limitation. Also, although certain example embodiments are described in connection with tabular data (i.e., data in rows an columns), it will be appreciated that the techniques disclosed herein may be used in connection with the logically equivalent and/or other data structures. Thus, although certain example embodiments are discussed in connection with extracting features on a column-by-column basis, it will be appreciated that the data may be divided into portions in other ways and that features may be more generally performed on a portion-by-portion basis (which includes column-by-column as one example).
Example Automatic Featurization Techniques The automatic featurization transforms raw data into a rich feature representation, enabling the subsequent error detection classifier to effectively identify potential erroneous data points. Certain example embodiments are able to leverage a diverse set of features, capturing various aspects of the data, to help ensure a comprehensive and robust error detection process. The featurization approach of certain example embodiments encompasses some or all of the following and/or other distinct yet complementary methods: bag-of-n-grams feature extraction with Term Frequency-Inverse Document Frequency (TF-IDF) normalization, metadata profiling, and word2Vec embeddings.

The bag-of-n-grams (BFN-gram) feature extraction method involves counting all character sequences of length n that appear in a given dataset column. This process captures the frequency and distribution of substring patterns, providing a rich representation of the textual data. To enhance the significance of these patterns, TF-IDF weighting scheme is used. TF-IDF assesses the importance of characters within a corpus (column) of documents (cell values) by balancing their frequency in a single document against their frequency across the entire corpus. This normalization helps ensure that common but less informative characters are downweighted, while rarer, more distinctive characters are emphasized. In certain example embodiments, a unigram mode is used by setting n to one. In this case, the feature extractor counts the occurrences of single characters, like 'A', 'a', and '1' for each cell in a given column.

Beyond the raw content of the data, metadata provides valuable insights into potential errors. Certain example embodiments incorporate several metadata features, including: (1) Value Occurrence Count, which captures the frequency of each unique value within a column, highlighting potential outliers or inconsistencies; (2) String Length, which captures the length of each cell value, which can be indicative of formatting errors or inconsistencies; (3) Data Type, which is a categorical feature that represents the inherent data type of each cell value (e.g., numeric, text, date), providing valuable context for error detection; and (4) Numeric Representation, which involves conversion of categorical values to numerical representations, where applicable, to facilitate mathematical operations and comparisons.

To capture semantic relationships between cell values, Word2Vec embeddings are used. This technique treats each tuple as a document and each cell value as a word. By analyzing the co-occurrence patterns of cell values within tuples, Word2Vec generates dense vector representations for each unique value. These vectors capture the semantic similarity between values, helping to ensure that values frequently appearing in similar contexts are located closer together in the embedding space. This semantic representation enhances the error detection process by identifying values that are semantically inconsistent with their surrounding context.

By combining these featurization methods, the approach of certain example embodiments is equipped with a diverse and comprehensive set of features that capture both the statistical and semantic properties of the data. This multi-faceted representation provides a robust foundation for the subsequent stages of error detection and repair, helping to ensure that the approach is both accurate and adaptable to a wide range of data types and error scenarios.
Example Counterfactual Mapping Techniques A technical challenge in counterfactual-based error repair is bridging the gap between the feature space, where counterfactuals reside, and the data space, where actual repairs are applied. Certain example embodiments address this technical challenge by implementing a nearest neighbor based mapping approach, leveraging the structure of the data to generate plausible and consistent repair candidates. In this regard, certain example embodiments operate by identifying the nearest neighbors of the generated counterfactual within a set of clean data records. These clean records, assumed to be free from the specific error being addressed, serve as a reference point for generating repairs. Clean data records are obtained by using the detections obtained by the ML-based error detection tool. To this end, the detected erroneous data points are filtered out from the input dataset to obtain the clean records.

Figure 9:
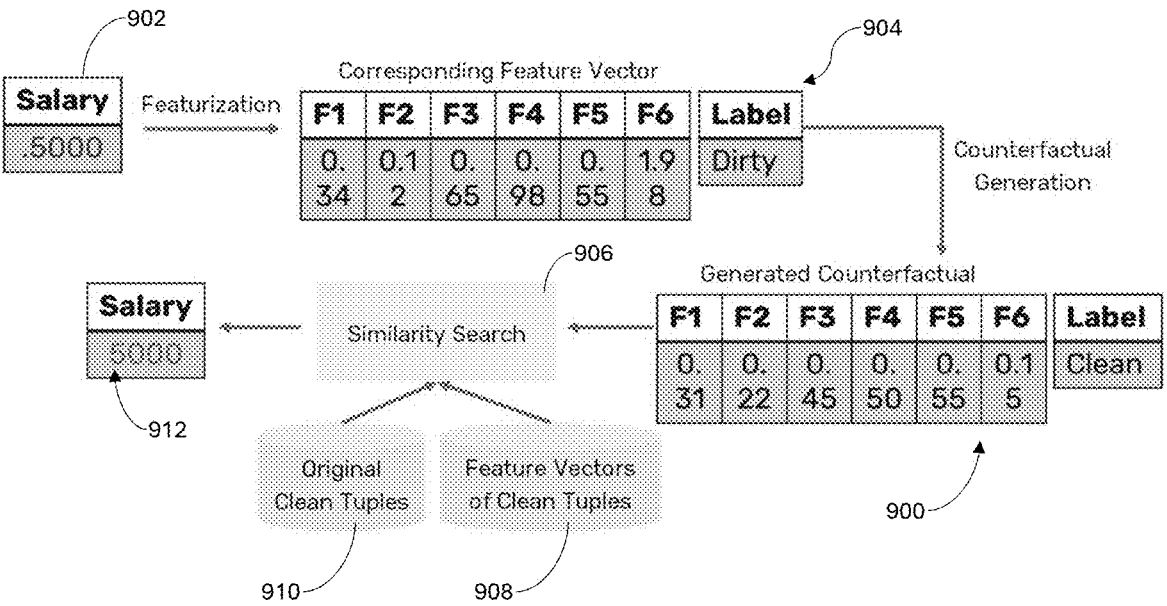
FIG. 9 helps demonstrate how counterfactual mapping and similarity searching can be used to repair data in accordance with certain example embodiments.

Certain example embodiments use a distance metric to quantify the similarity between the feature vector of the generated counterfactual and the feature vectors of the clean tuples. This distance metric captures the degree of resemblance between the counterfactual and each clean record, enabling identification of the most similar candidates. This feature vector also encapsulates the corrections but in a more conceptual form. Consider the example illustrated in FIG. 9, for example. Assume that the counterfactual generator produced a feature vector representing a potential repair (generated counterfactual feature vector 900) for a typographical error in the salary field 902 (in which the value is indicated to be 0.5000) based on the corresponding feature vector 904 resulting from featurization. Certain example embodiments implement a similarity search 906 compare this counterfactual feature 900 vector to the feature vectors of clean records 908, identifying those with the most similar name structures, based on distance-based similarity.

Once the nearest neighbors are identified, their attribute values are used to generate repair candidates for the erroneous record. More particularly, the values of corresponding attributes from the nearest clean records 910 are propagated to the counterfactual feature vector 904. This process effectively translates the counterfactual from the feature space back to the data space, resulting in a repaired data instance 912 (in this example having a value of 5000 rather than 0.5000) that is both consistent with the counterfactual explanation and grounded in the characteristics of the clean data. By leveraging the information contained within clean data records and exploiting the power of nearest neighbor search, the mapping approach of certain example embodiments helps ensure that the generated repair candidates are not only effective in correcting the identified errors but also plausible and consistent with the underlying data distribution. This approach is technically advantageous in that it effectively bridges the gap between counterfactual explanations and actionable data repairs, paving the way for more robust and reliable error correction in databases. The Heterogeneous Euclidean Overlap Method (HEOM) is one concrete example of a similarity or distance metric that may be used. It will be appreciated, however, that other distance metrics may be used in different example embodiments.

Example Counterfactual Selection Techniques

An example approach for generating plausible repair candidates has been described above. Certain example embodiments also help to ensure that these repairs improve the performance of downstream ML tasks. This section explains the approach to optimal counterfactual selection, leveraging a differentiable ML pipeline optimization technique, e.g., based on techniques adapted from B. Hilprecht, C. Hammacher, E. S. Reis, M. Abdelaal and C. Binnig, "DiffML: End-to-end differentiable ML pipelines," in *Proceedings of the Seventh Workshop on Data Management for End-to-End Machine Learning* (*SIGMOD*), Seattle, 2023, the entire contents of which are hereby incorporated herein in their entirety. The optimization technique of certain example embodiments helps address the technical challenge of selecting the most effective counterfactual by jointly learning the optimal repaired feature subset and the parameters of the downstream ML model. This joint optimization helps ensure that the selected counterfactual not only corrects the identified error, but also maximizes the performance of the downstream task.

Figure 10:
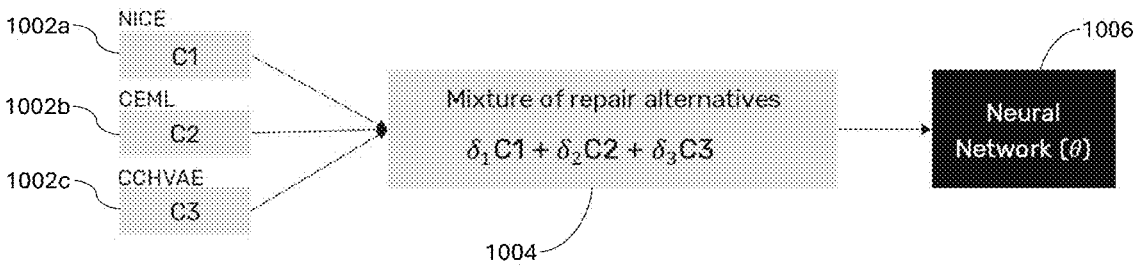
FIG. 10 is an example showing how to select the best counterfactual through the mixture of repair alternatives in accordance with certain example embodiments.

The counterfactual selection technique is able to assign a learnable weight to each feature, representing its importance in the downstream ML task. These weights are learned through backpropagation, allowing the model to automatically identify the most informative features for the specific task. Consider the example illustrated in FIG. 10, which is an example showing how to select the best counterfactual through the mixture of repair alternatives in accordance with certain example embodiments. Each of boxes 1002a-1002c represents a counterfactual-based repaired column generated by a different counterfactual method (C1, C2, C3 as shown in FIG. 10). The counterfactual selection technique assigns weights ($\delta 1$, $\delta 2$, $\delta 3$) to each of these repaired columns, signifying their potential contribution to the downstream ML task. Then, a mixture of pipeline alternatives 1004 is created and used as an input to the downstream ML model 1006 (which in this example is a neural network, although other ML model types may be used in different downstream ML models in different example embodiments). Accordingly, the weights ($\delta 1$, $\delta 2$, $\delta 3$) are continuously adjusted during the training process to maximize the performance of the downstream model 1006.

Depending on the values obtained for $\delta 1$, $\delta 2$, $\delta 3$, C1, C2, or C2 may be selected. For instance, if $\delta 1$ is equal to one and the other weights are zeros, it implies that C1 is the most well-suited repair candidate. However, in many cases the values of $\delta 1$, $\delta 2$, and $\delta 3$ will be between zero and one. In this case, instead of selecting a single "best" counterfactual, the counterfactual selection technique of certain example embodiments generates a combination of the counterfactual columns. This approach recognizes that the optimal repair may involve integrating aspects of multiple counterfactual candidates. By optimizing for all sets of parameters with respect to the downstream ML task, the counterfactual selection technique advantageously identifies the combination of repaired features and their corresponding weights that yield the highest performance. This joint optimization in turn advantageously helps ensure that the selected counterfactual not only corrects the data, but also aligns with the specific objectives of the downstream ML model.

It will be appreciated that the example techniques described herein work well for numeric data. However, the techniques described herein are not limited to working only with numeric data. For example, adaptations can be made to work with other types of data. In this regard, and as an example, the approach can be adapted to work with categorical data. In such situations, instead of directly combining the values, a weighted voting system can be used for categorical variables. Each counterfactual candidate (C1, C2, etc.) may receive a vote weighted by its corresponding $\delta$ value. The category with the highest weighted vote may be selected for the final combination in such instances.

Example Process Flow

FIG. 11 is pseudocode explaining the data repair pipeline of certain example embodiments. This pipeline provides a systematic approach to identifying and repairing errors within a dataset while optimizing the performance of a downstream ML model. The algorithm outlines a five-step process for data repair: (1) automatic featurization (Lines 2-4), (2) error detection (Lines 5-6), (3) applying counterfactual algorithms (Lines 7-8), (4) counterfactual mapping (Lines 9-15), and (5) repair candidate selection (Lines 17-19).

The first step focuses on transforming the raw data into a feature-based representation suitable for both error detection and counterfactual generation. For each column in the dataset, a comprehensive set of features (e.g., including Metadata, Word2Vec Embeddings, Normalized Bag-of-N-Grams) is extracted. The second step utilizes an existing error detection method (in this example, ED2) to identify erroneous data instances within the dataset. The error detection model leverages the feature set generated in Step 1 to classify each tuple as either erroneous (1) or clean (0). The third step involves applying multiple counterfactual algorithms to generate a diverse set of repair candidates for each erroneous data instance. Each algorithm "explores" different ways to perturb the original feature values to generate counterfactuals that would ideally flip the error detection model's prediction from erroneous to clean.

The fourth step maps the generated counterfactuals from the feature space back to the data space, producing concrete repair candidates. For each counterfactual, the nearest neighbor is identified from among the clean data instances based on a chosen similarity measure. The values from the corresponding attributes of the nearest clean instance are then used to generate the repaired data instance. The fifth step focuses on selecting the optimal set of repair candidates from the pool generated in Step 4. Instead of simply choosing the "closest" repair for each erroneous instance (which is possible in certain different embodiments), a more nuanced approach is employed in this example. That is, a differentiable ML pipeline optimization technique is used to learn the optimal combination of repair candidates that maximizes the performance of a downstream ML task. The pipeline outputs the repaired dataset, incorporating the selected repair candidates, and the estimated loss of the downstream ML model trained on this repaired data. This output provides a quantitative measure of the effectiveness of the repair process in improving the quality of the data for the intended downstream task.

Figure 12:
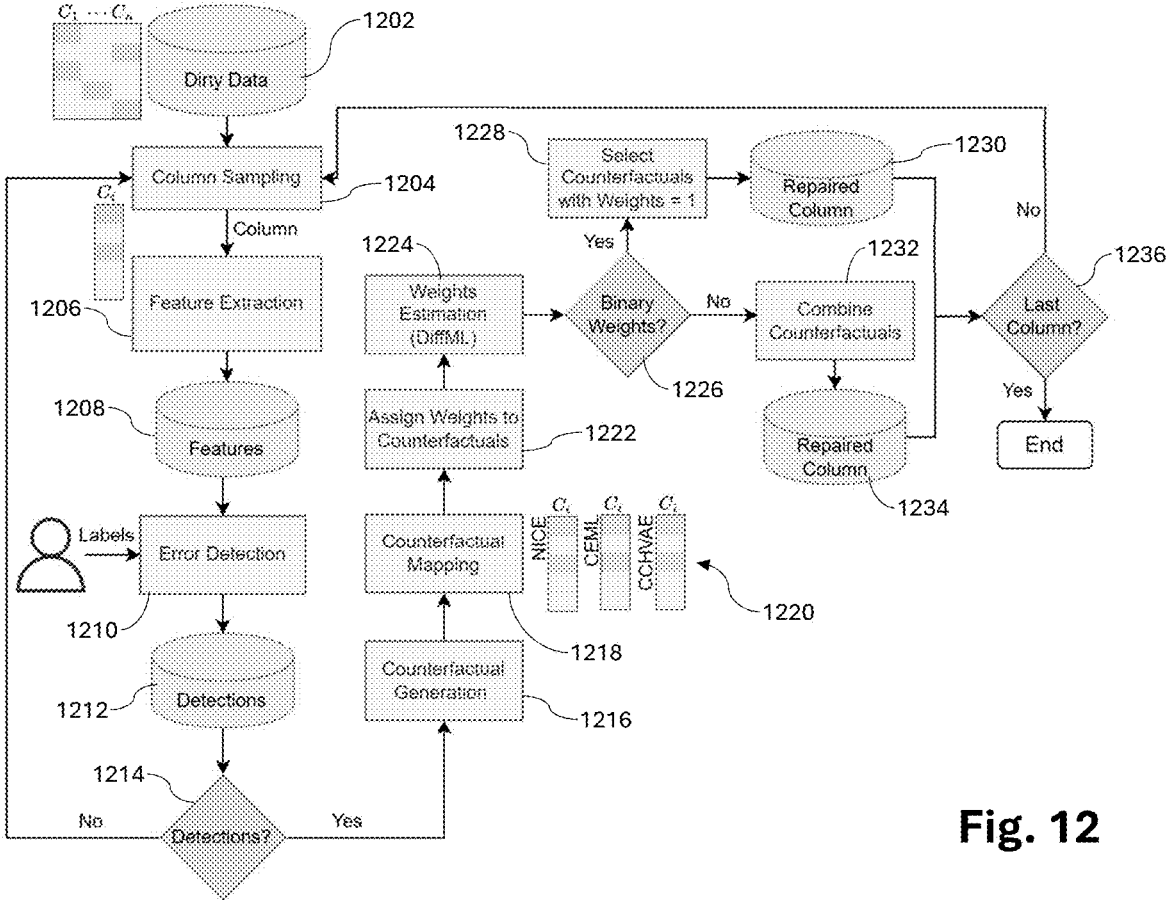
FIG. 12 is a logical flow diagram showing the end-to-end operation of certain example embodiments.

FIG. 12 is a logical flow diagram showing the end-to-end operation of certain example embodiments. The diagram shows that the architecture of certain example embodiments employs a column-wise processing approach, systematically repairing each column in the dataset while leveraging counterfactual explanations and a differentiable optimization strategy for superior repair quality. More particularly, as shown in FIG. 12, the system samples a single column (1204) from the dirty dataset (1202) for repair. This column-wise approach allows for focused processing and facilitates the application of specialized repair techniques tailored to specific data types and error patterns. For the selected column, a rich set of features is extracted (1206). In at least certain example embodiments, the features (1208) encompass metadata (e.g., data type, value frequency), semantic embeddings (e.g., Word2Vec), and statistical representations (e.g., normalized bag-of-n-grams).

Utilizing pre-trained error detection models and incorporating user-provided labels, the system identifies potential errors (1210) within the column. The output of this stage is a set of "detections" (1212), in essence flagging the erroneous values. A conditional check (1214) determines if any errors were detected in the previous operation (1210). If no errors are found, the pipeline skips the repair process for this column and moves to the next one by sampling the next column (1204). For each detected error, the system employs multiple counterfactual generation algorithms (1216) such as, for example, NICE, CEML, and CCHVAE, to produce a diverse set of repair candidates. These algorithms propose minimal changes to the original erroneous values, aiming to transform them into plausible clean values.

A counterfactual mapping operation (1218) maps each generated counterfactual in the set of generated counterfactuals (1220) from the feature space back to the original data domain. Utilizing the counterfactual selection technique of certain example embodiments, the system assigns learnable weights (1222) to each generated counterfactual in the set of generated counterfactuals (1220). These weights (1222) represent the potential contribution of each repair candidate to the performance of a downstream ML task (1224). The system checks if the learned weights are binary, i.e., 0 or 1 (1226). Binary weights indicate that the counterfactual selection technique has confidently selected a single "best" repair candidate for each error. If the weights are binary, the system selects the counterfactuals with a weight of 1 (1228), thereby representing the most effective repairs, and applying the repairs accordingly (1230). If the weights are not binary, indicating that multiple counterfactuals contribute to the optimal solution, the system combines the proposed repairs based on their learned weights (1232) and applies the repairs accordingly (1234). This combination strategy allows for more nuanced and potentially more accurate repairs. Finally, the system checks if all columns in the dataset have been processed (1236). If not, the pipeline returns to sample the next column (1204) for the next iteration. Once all columns have been repaired, the pipeline terminates, producing the final repaired dataset.

Once the final repaired dataset is generated, it can be used by the downstream ML model. For example, a repaired dataset may be used to train a model to make predictions or respond to queries in a wide variety of contexts such as, for example, in cancer and/or other medical diagnoses by scanning MRIs and/or other medical data, autonomous driving applications (e.g., where visioning, decisions about when to change lanes, etc., need to be made), predicting when a piece of machinery used in a factory or other workspace might need repairs, predicting when to dynamically allocate processing resources in a distributed computing or other environment (e.g., based on projected periods of heavy use, increased network latency, etc.), making more accurate market predictions, improving credit scoring technology, detecting fraud, in environmental science for more accurate climate-related predications and ecosystem monitoring, in meteorological applications for predicting weather patterns, and so on. Indeed, the repaired datasets can be used in a variety of different technical contexts.

It will be appreciated that the technology disclosed herein may be used in connection with a wide variety of technology backbones. For example, a repair tool implementing the algorithm of FIG. 11 and aspects of the FIG. 12 may be located on a standalone computer, a networked environment (e.g., it may be accessed via a distributed computing environment such as a cloud-based network), etc. The computer(s) hosting a repair tool implementing the algorithm of FIG. 11 and aspects of the FIG. 12 may be the same as, or different from, the computer(s) hosting the ML model with which the data is to be used. The raw data in the dataset likewise may be stored together with or remote from either or both of the tool and the ML model. For instance, the dataset may be stored to a data store and accessed via a suitable interface (e.g., API or other calls to a database management system, over a network connection, via direct read/write or other I/O operations on a local or remote machine, through SQL or other queries, etc.). Each computer in general will include at least one processor and a memory. Computers with which a user will interact (e.g., to initiate the repair, review results, etc.) typically will have further user interface tools such as, for example, a display device such as a monitor, a keyboard/mouse, etc. In certain example embodiments, the tool may be accessible via command-line operations. In other example embodiments, it may be accessible via a web portal. It is noted that the feature extractors, error detectors, and/or other modules may be integrated into a single software package in one or more program code modules, or it they may be spread across multiple applications. For example, a coordinating application may call external services or the like to perform featurization, error detection, counterfactual generation, counterfactual mapping, ML model testing, and/or the like. In this regard, certain example embodiments may be implemented as software running in conjunction with one or more processors and memory as indicated above.

Test Results

To assess the efficacy of the data repair approach of certain example embodiments, a comprehensive evaluation was performed using two real-world datasets, namely, the Breast Cancer Dataset (see as described in, for example, M. Abdelaal et al., "REIN: A Comprehensive Benchmark Framework for Data Cleaning Methods in ML Pipelines," ArXiv, 2023) and the Wine Quality Dataset (available from the University of California Irvine Machine Learning Repository; see DOI 10.24432/C56S3T). These datasets represent typical classification tasks, with the former aiming to predict the malignancy of tumor samples (benign or malignant), and the latter focused on identifying the type of wine (white or red) based on its chemical properties. To simulate real-world data imperfections, synthetic errors were injected into both datasets using the "error-generator" Python library. This library allows for the introduction of realistic errors, such as missing values, outliers, and inconsistencies, while controlling for error type and severity. This controlled error injection allows for a systematic evaluation of the repair approach's robustness and performance under various data quality scenarios.

The approach of certain example embodiments was compared against a widely used ML-based imputation technique as a baseline. This baseline method employs the k-Nearest Neighbors (KNN) algorithm for imputation in numerical columns and the MissForest algorithm for categorical columns. These methods represent commonly employed techniques for handling data errors, providing a relevant benchmark for evaluating the effectiveness of certain example embodiments. To quantify the performance of both certain example embodiments and the baseline, the impact of data repair on the downstream classification task was measured. Standard classification metrics, including accuracy, precision, recall, and F1-score, were used to assess the models' performance on the repaired datasets.

For each dataset, a five-fold cross-validation scheme was used to help ensure robust and statistically sound results. Further experimentations were performed with varying levels of error injection to analyze the respective approaches' sensitivity to data quality degradation. FIGS. 13A-13B show the results of this evaluation, comparing the data repair method of certain example embodiments (labeled "Combined2") against the baseline ML-based imputation technique (labeled "mlImputer") on both the Breast Cancer and Wine Quality datasets. More particularly, FIG. 13A illustrates the F1 scores achieved by both approaches on the Breast Cancer dataset across varying error rates. The approach of certain example embodiments consistently outperforms the baseline imputer, maintaining a higher F1 score across all error rates. The results in FIG. 13A highlight the effectiveness of the approach of certain example embodiments, in generating high-quality repairs that preserve the underlying data distribution and improve the accuracy of the downstream malignancy prediction task.

Both methods exhibit a general downward trend in F1 score as the error rate increases. This observation aligns with the intuition that higher error rates lead to more significant data corruption, making accurate repair increasingly challenging. It will be appreciated, however, that certain example embodiments nonetheless are able to demonstrate greater robustness to increasing error rates, maintaining a more stable performance compared to the baseline.

FIG. 13B illustrates the results on the Wine Quality dataset. As will be appreciated from FIG. 13B, certain example embodiments provide superior performance for the majority of error rates tested compared to the baseline approach. After an error rate of 15%, "Combined2" consistently outperforms the baseline "mlImputer," achieving a higher F1 score. This suggests that the approach of certain example embodiments is particularly effective in handling scenarios with moderate to high error rates in this dataset. The ability of certain example embodiments to leverage counterfactual explanations and optimize repairs for the specific downstream task likely contributes to its stronger performance in these more challenging scenarios. The observed fluctuations in F1 scores for both methods across different error rates highlight the complex interplay between dataset characteristics, error patterns, and the effectiveness of repair techniques.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for repairing a dataset to be used in a downstream machine learning (ML) model, the system comprising:

an interface to a data store storing the dataset; and a memory and at least one processor configured to perform operations comprising:

extracting features from the dataset stored to the data store, on a portion-by-portion basis; and for each portion:

applying an error detection algorithm to identify erroneous data instances in the dataset using the extracted features associated with the respective portion; and for each identified erroneous data instance:

determining a set of feature-space repair candidates including a plurality of feature-space repair candidates, each feature-space repair candidate in the set of feature-space repair candidates having at least one change with respect to the extracted features associated with the respective erroneous data instance;

for each feature-space repair candidate, generating a data-space repair candidate by (a) finding a matching non-erroneous data instance within the respective portion, and (b) using one or more values from the matching non-erroneous data instance in place of one or more corresponding values in the respective erroneous data instance;

generating a repaired instance based on one or more of the data-space repair candidates; and updating the portion to include the repaired instance rather than the respective erroneous data instance, in repairing the dataset in the data store.

2. The system of claim 1, wherein the extracted features include metadata, one or more semantic embeddings, and one or more statistical representations related to the dataset in the data store.

3. The system of claim 1, wherein the error detection algorithm is an ML-based error detector.

4. The system of claim 1, wherein a plurality of error detection algorithms are applied in the identification of the erroneous data instances in the dataset.

5. The system of claim 1, wherein the application of the error detection algorithm assigns a label to each data instance in each portion, the label identifying whether the associated data instance is an erroneous data instance or a clean data instance.

6. The system of claim 1, wherein matching non-erroneous data instances are located by finding a nearest neighbor based on a similarity metric.

7. The system of claim 1, wherein the generation of a given repaired instance based on one or more corresponding data-space repair candidates comprises assigning a weight to each corresponding data-space repair candidate, the weight indicating a potential contribution of the associated data-space repair candidate to performance of the ML model.

8. The system of claim 7, wherein the generation of the given repaired instance further comprises:

assigning a weight to each corresponding data-space repair candidate, the weight indicating a potential contribution of the associated data-space repair candidate to performance of the ML model;

in response to the assigned weights indicating that there is a single best corresponding data-space repair candidate, using the single best corresponding data-space repair candidate as the given repaired instance; and in response to the assigned weights indicating that there is not a single best corresponding data-space repair candidate, combining the corresponding data-space repair candidates in accordance with their assigned weights in generating the given repaired instance.

9. The system of claim 1, wherein the feature-space repair candidates are generated as counterfactuals, wherein each counterfactual represents a minimal set of changes to the feature(s) of the associated erroneous data instance that would change output from the error detection algorithm from erroneous to clean.

10. A method for repairing a dataset to be used in a downstream machine learning (ML) model, the method comprising:

extracting features from a dataset, which is stored in a data store, on a portion-by-portion basis; and for each portion:

applying an error detection algorithm to identify erroneous data instances in the dataset using the extracted features associated with the respective portion; and for each identified erroneous data instance:

determining a set of feature-space repair candidates including a plurality of feature-space repair candidates, each feature-space repair candidate in the set of feature-space repair candidates having at least one change with respect to the extracted features associated with the respective erroneous data instance;

for each feature-space repair candidate, generating a data-space repair candidate by (a) finding a matching non-erroneous data instance within the respective portion, and (b) using one or more values from the matching non-erroneous data instance in place of one or more corresponding values in the respective erroneous data instance;

generating a repaired instance based on one or more of the data-space repair candidates; and updating the portion to include the repaired instance rather than the respective erroneous data instance, in repairing the dataset in the data store.

11. The method of claim 10, wherein the extracted features include metadata, one or more semantic embeddings, and one or more statistical representations related to the dataset in the data store.

12. The method of claim 10, wherein the application of the error detection algorithm assigns a label to each data instance in each portion, the label identifying whether the associated data instance is an erroneous data instance or a clean data instance.

13. The method of claim 10, wherein matching non-erroneous data instances are located by finding a nearest neighbor based on a similarity metric.

14. The method of claim 10, wherein the generation of a given repaired instance based on one or more corresponding data-space repair candidates comprises:

assigning a weight to each corresponding data-space repair candidate, the weight indicating a potential contribution of the associated data-space repair candidate to performance of the ML model;

assigning a weight to each corresponding data-space repair candidate, the weight indicating a potential contribution of the associated data-space repair candidate to performance of the ML model;

in response to the assigned weights indicating that there is a single best corresponding data-space repair candidate, using the single best corresponding data-space repair candidate as the given repaired instance; and in response to the assigned weights indicating that there is not a single best corresponding data-space repair candidate, combining the corresponding data-space repair candidates in accordance with their assigned weights in generating the given repaired instance.

15. The method of claim 10, wherein the feature-space repair candidates are generated as counterfactuals, such that wherein each counterfactual represents a minimal set of changes to the feature(s) of the associated erroneous data instance that would change output from the error detection algorithm from erroneous to clean.

16. A non-transitory computer readable storage medium tangibly storing instructions that, when executed by at least one processor, perform operations comprising:

extracting features on a portion-by-portion basis from a dataset, which is stored in a data store, to be used in a downstream machine learning (ML) model; and for each portion:

applying an error detection algorithm to identify erroneous data instances in the dataset using the extracted features associated with the respective portion; and for each identified erroneous data instance:

determining a set of feature-space repair candidates including a plurality of feature-space repair candidates, each feature-space repair candidate in the set of feature-space repair candidates having at least one change with respect to the extracted features associated with the respective erroneous data instance;

for each feature-space repair candidate, generating a data-space repair candidate by (a) finding a matching non-erroneous data instance within the respective portion, and (b) using one or more values from the matching non-erroneous data instance in place of in Hey-of-one or more corresponding values in the respective erroneous data instance; generating a repaired instance based on one or more of the data-space repair candidates; and updating the portion to include the repaired instance rather than the respective erroneous data instance, in repairing the dataset in the data store.

17. The non-transitory computer readable storage medium of claim 16, wherein the extracted features include metadata, one or more semantic embeddings, and one or more statistical representations related to the dataset in the data store.

18. The non-transitory computer readable storage medium of claim 16, wherein the application of the error detection algorithm assigns a label to each data instance in each portion, the label identifying whether the associated data instance is an erroneous data instance or a clean data instance.

19. The non-transitory computer readable storage medium of claim 16, wherein the generation of a given repaired instance based on one or more corresponding data-space repair candidates comprises:

assigning a weight to each corresponding data-space repair candidate, the weight indicating a potential contribution of the associated data-space repair candidate to performance of the ML model;

assigning a weight to each corresponding data-space repair candidate, the weight indicating a potential contribution of the associated data-space repair candidate to performance of the ML model;

in response to the assigned weights indicating that there is a single best corresponding data-space repair candidate, using the single best corresponding data-space repair candidate as the given repaired instance; and in response to the assigned weights indicating that there is not a single best corresponding data-space repair candidate, combining the corresponding data-space repair candidates in accordance with their assigned weights in generating the given repaired instance.

20. The non-transitory computer readable storage medium of claim 16, wherein the feature-space repair candidates are generated as counterfactuals, such wherein each counterfactual represents a minimal set of changes to the feature(s) of the associated erroneous data instance that would change output from the error detection algorithm from erroneous to clean.

*  *  *  *  *